United States Patent
Raivisto (10) Patent No.: US 6,556,835 B1
(45) Date of Patent: Apr. 29, 2003

(54) IMPLEMENTATION OF MULTICAST MESSAGING IN A MOBILE TELECOMMUNICATIONS NETWORK

(75) Inventor: Tommi Raivisto, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/639,248

(22) Filed: Aug. 15, 2000

Related U.S. Application Data (63) Continuation of application No. 08/940,375, filed on Sep. 30, 1997, now abandoned.

(30) Foreign Application Priority Data

Sep. 24, 1997 (FI) .................................................. 973772

(51) Int. Cl.[7] ........................... H04Q 7/20; G06F 9/445
(52) U.S. Cl. .................... 455/466; 455/412; 455/422; 717/172; 717/177; 370/432; 380/247; 380/271; 713/163
(58) Field of Search ................................ 713/153, 151, 713/163, 162; 380/247, 270–272; 455/466, 426, 422, 525, 560, 411, 412; 370/342, 432–434, 441; 717/171–173, 176–178

(56) References Cited

U.S. PATENT DOCUMENTS

| | | | |
|---|---|---|---|
| 4,365,110 A | | 12/1982 | Lee et al. ..................... 380/28 |
| 4,634,808 A | | 1/1987 | Moerder ....................... 380/29 |
| 4,878,051 A | | 10/1989 | Andros et al. ........... 340/825.44 |
| 4,881,073 A | | 11/1989 | Andros et al. ........... 340/825.44 |
| 5,278,890 A | | 1/1994 | Beeson, Jr. et al. ........ 455/31.2 |
| 5,329,573 A | | 7/1994 | Chang et al. ............... 455/411 |
| 5,396,543 A | | 3/1995 | Beeson, Jr. et al. ......... 433/560 |
| 5,404,580 A | * | 4/1995 | Simpson et al. ............. 455/558 |
| 5,659,615 A | | 8/1997 | Dillon .......................... 380/21 |
| 5,806,000 A | * | 9/1998 | Vo et al. ...................... 455/466 |
| 5,974,300 A | * | 10/1999 | LaPorta et al. ............. 455/31.2 |
| 6,026,296 A | * | 2/2000 | Sanders, III et al. ........ 455/426 |
| 6,081,601 A | * | 6/2000 | Raivisto ...................... 380/270 |
| 6,188,911 B1 | * | 2/2001 | Wallentin et al. ........... 455/524 |
| 6,289,223 B1 | * | 9/2001 | Mukherjee et al. ......... 455/466 |

FOREIGN PATENT DOCUMENTS

| | | | |
|---|---|---|---|
| EP | 0 699 009 | | 2/1996 |
| EP | 0 777 394 | | 6/1997 |
| EP | 0 795 970 | | 9/1997 |
| WO | WO 99/14888 | * | 3/1999 |
| WO | WO 99/16277 | * | 4/1999 |

OTHER PUBLICATIONS

M. Mouly and M. Pautet; *The GSM System for Mobile Communications*; Palaiseau, France, ISBN (1992).

Tommi Raivisto, Master's Thesis: "Applying Cryptography to GSM Short Message Services"; HUT/Tietotekniikan osasto (1997).

(List continued on next page.)

*Primary Examiner*—Tuan Q. Dam
(74) *Attorney, Agent, or Firm*—Squire, Sanders & Dempsey L.L.P.

(57) ABSTRACT

In a method for multicasting in a radio network, having at least one base station and multiple mobile terminals, the broadcast message is broadcast from the base station, and the broadcast message is received at the mobile terminals. Furthermore, a broadcast message is formulated as a multicast message, and a token is delivered to a selected group of mobile terminals. The token is needed to recover the information of the multicast message. The selected group of mobile terminals includes at least two mobile terminals. The token is used by the selected group of mobile terminals to allow the reception and recovery of the multicast message.

15 Claims, 6 Drawing Sheets

OTHER PUBLICATIONS

R. Tafazolli, et al., A Flexible Multiple Access Scheme for Mobile Communications, 90 IEE Colloquium on University Research in Mobile Radio, Oct. 1, 1990–Oct. 6, 1990.

J. Hellaker, et al., Real–Time Traveller Information in Everyone's Pocket?—A Pilot Test Using Hand–Portable GSM Terminals, 93 Proceedings of the IEEE–IEE Vehicle Navigation and Information Systems Conference 49–52, 1993.

Bruce Schneier, Applied Cryptography: Protocols, Algorithms, and Source Code in C, 1994.

G.J. Proudler, et al., Trialling GSM Data Services for the Mobile Office, 95 IEE Colloquium on Roaming with Data 1–4, 1995.

Robert J. Dyer and Robert P. Rice Jr., Wideband Networking Enhancements for SINCGARS, 95 Conference Record, IEEE Military Communications Conference Record, 911–155, 1995.

William Biagini and Michael Masciari, Efficient Use of SATCOM Resources in MSE Networks (DAMA for MSE), 93 IEEE Military Communications Conference Record, 768–73, 1993.

"European digital cellular telecommunications system (Phase 2); Technical realization of Short Message Service Cell Broadcast (SMSCB)", European Telecommunications Standards Institute, Second Edition, Dec. 1995, pp 1–23.

* cited by examiner

Fig. 8

IMPLEMENTATION OF MULTICAST MESSAGING IN A MOBILE TELECOMMUNICATIONS NETWORK

This application is a continuation of application Ser. No. 08/940,375, filed Sep. 30, 1997 now abandoned. The application is incorporated herein by reference.

FIELD OF THE INVENTION

The invention relates to a multicast service providing message delivery to selected subscribers in a mobile telecommunications network.

BACKGROUND OF THE INVENTION

In the digital GSM mobile communications system (Global System for Mobile communications), in addition to speech and data connections a short message service is implemented. Short messages are transmitted along control and signaling channels with other signaling of the network. Short message services can be divided into point-to-point and cell broadcast services. Point-to-point short messages are either mobile originating or mobile terminating. Cell broadcast short messages are transmitted from base stations and are intended for all mobile stations in the coverage area of the transmission. Examples of cell broadcast services are traffic and weather information delivery.

Figure 1:
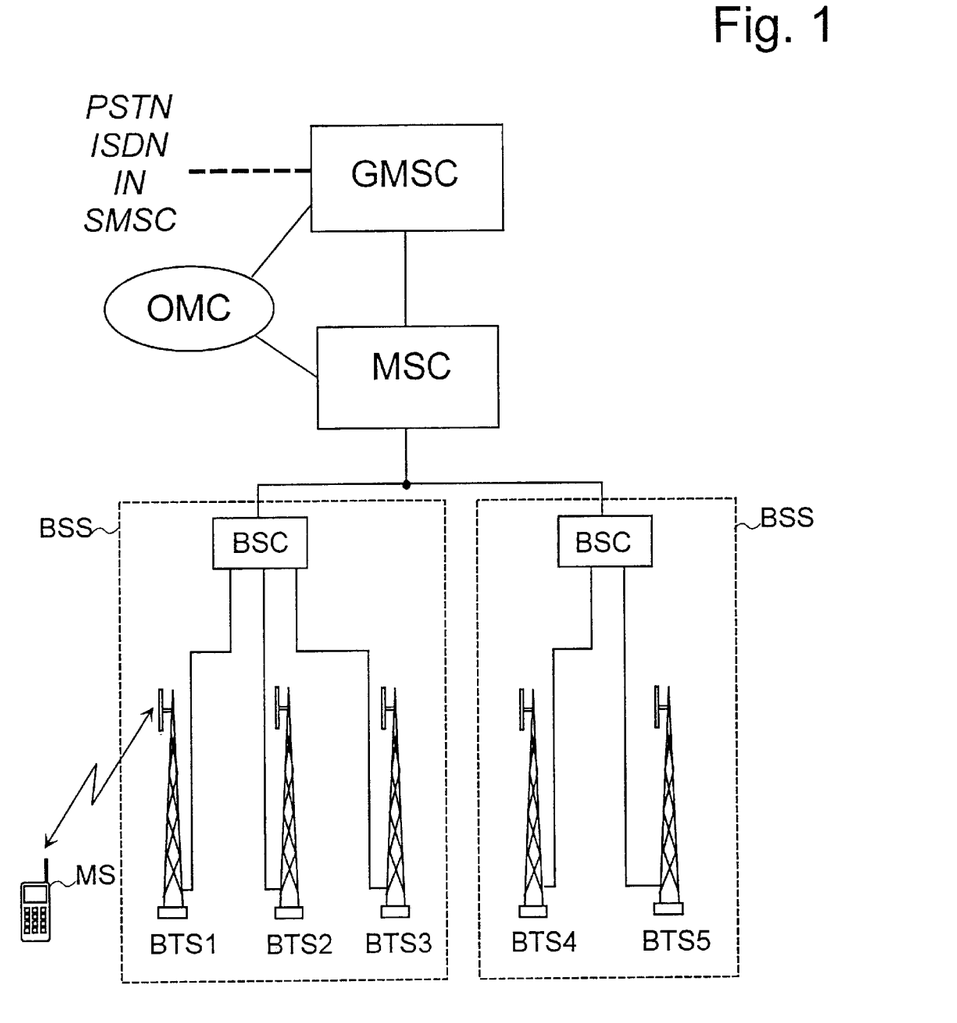
FIG. 1 shows the parts of the mobile communication network that are essential for the invention.

FIG. 1 of the attached drawing shows a simplified block diagram of the GSM mobile communications system. The mobile station MS is connected via a radio path to a base transceiver station BTS, in FIG. 1, to the base station BTS1. A base station sub-system BSS consists of a base station controller BSC and, the base stations BTS controlled by it. A mobile services switching center MSC usually controls several base station controllers BSC and is connected to other mobile services switching centers and a GMSC (Gateway Mobile Services Switching Center). Via the GMSC, the GSM network is connected to other networks, such as the PSTN (Public Service Telephone Network), another mobile communication network PLMN, the ISDN network, the intelligent network IN, or the short message service center SMSC. The operation of the entire GSM system is monitored by the operation and maintenance center OMC.

Figure 2:
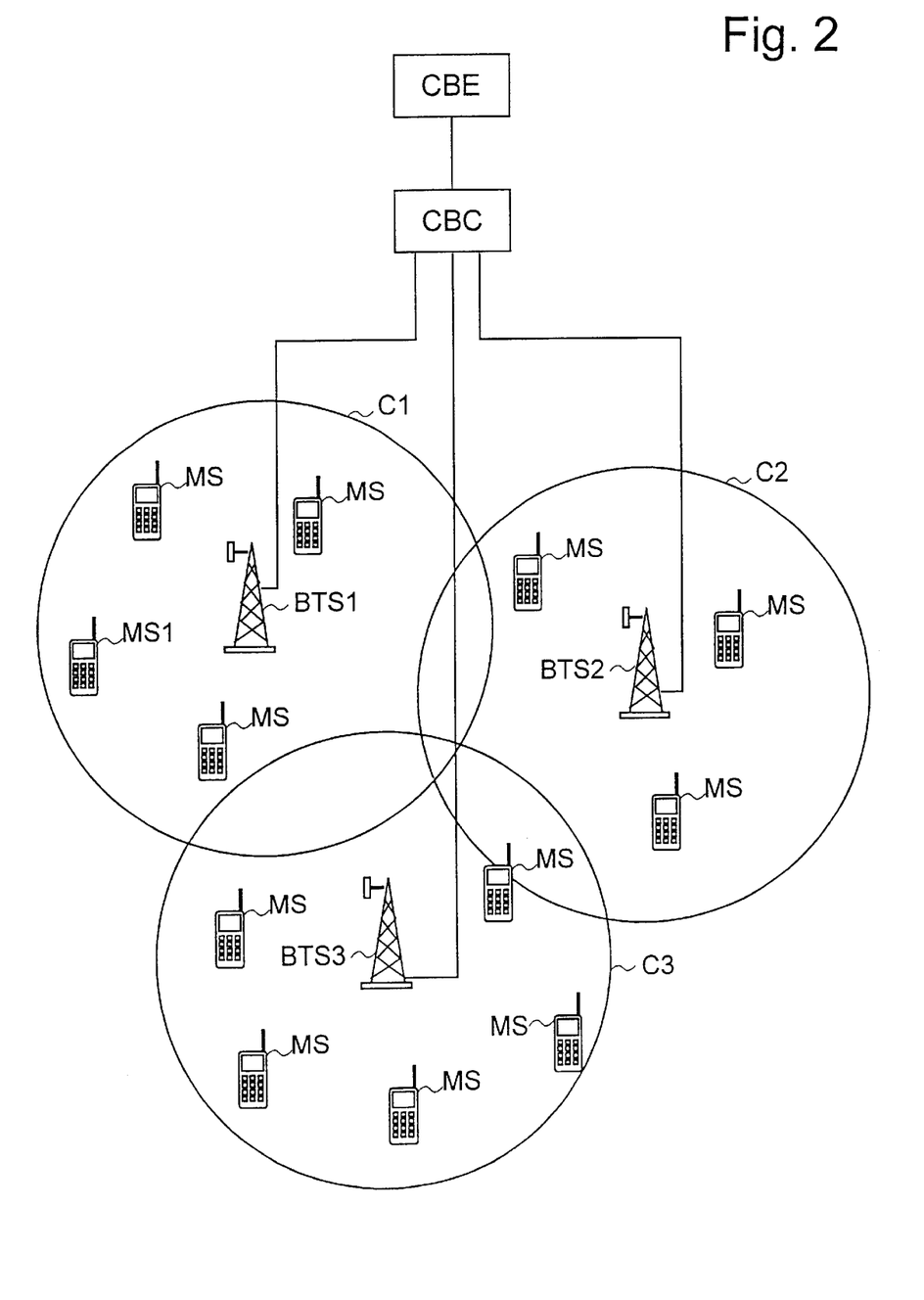
FIG. 2 shows a prior art cell broadcast network.

FIG. 2 of the attached drawing illustrates three cells C1, C2, and C3, which offer cell broadcast messages to all the mobile stations MS located in these cells, including the one marked MS1. It would also be possible to transmit cell broadcast messages only from some cells, for example, from cells C1 and C2. The cell broadcast messages are created by a cell broadcast entity CBE, a news agency, for example, and they are transmitted to mobile stations MS via an appropriate mobile communications network. The CBE transfers the cell broadcast message to a cell broadcast center CBC connected with the BSC in the GSM network, in this example. The cell broadcast center CBC controls the message transmission on the cell broadcast channels of individual BTSs, and transmits via the BSC the messages to each BTS addressed. The cell broadcast is transmitted across the air interface in the cell broadcast channel BCCH of the BTS or in paging channels PCH. Cell broadcast is intended for all receiving mobile stations, therefore it is not addressed nor encrypted. For a more detailed description of cell broadcast, a reference is made to the GSM-specification GSM 03.41 "European digital cellular telecommunication system (Phase 2); Technical realization of Short Message Service Cell Broadcast (SMSCB)".

In order to implement the point-to-point short message service, the GSM network is connected to the short message service center SMSC. The SMSC forms a connection between a particular short message network and the GSM network by transferring the shotmessage from outside the GSM network to a mobile subscriber and from one mobile subscriber to another or to some other unit outside the GSM network that is able to receive short messages. A mobile terminating short message is routed from the short message network via the short message service center SMSC to the MSC of the GSM network and from there via the appropriate BSC and BTS to the mobile station MS, i.e. via BTS1 to MS1 in FIGS. 1 and 2. Accordingly, a mobile originating short message is transmitted from the MS via BTS and BSC to the MSC which transfers the short message from the GSM network to the SMSC, in order to be transmitted to the appropriate short message network. Short messages are transferred transparently in the network between the short message service center SMSC and the mobile station MS.

Figure 3:
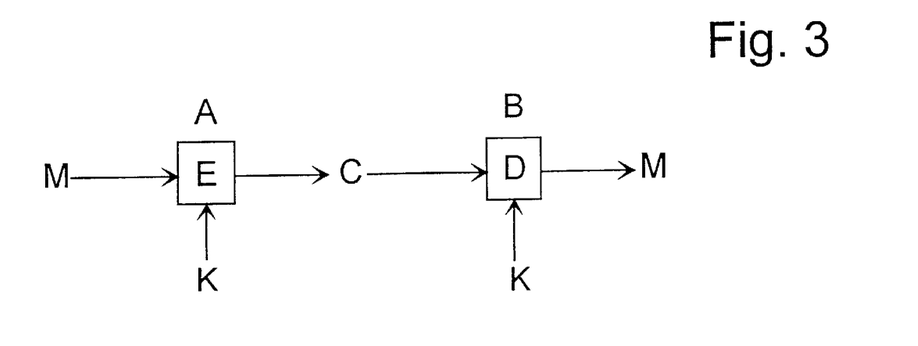
FIG. 3 shows a known symmetric ciphering algorithm as a block diagram.

The confidentiality of the transmission is sometimes arranged with ciphering, for example. FIG. 3 of the attached drawing shows a block diagram of a known symmetric cipher algorithm which can be used to protect transmission. The symmetric ciphering algorithm is based on a secret key shared between the communicating parties. At party A's end the message M to be sent to party B is encrypted in box E in FIG. 3 with the shared secret key K. The message is sent over a transmission route as the encrypted cipher text C, which party B can decrypt in box D shown in FIG. 3 with the same secret key K. Through decryption party B gets the original message M.

An intruder eavesdropping on the transmission needs to know the secret key K in order to be able to read and understand the transmitted cipher text C. The encryption and decryption of the symmetric algorithm can be expressed by the equations:

$$C = E_K(M)$$

$$M = D_K(C),$$

where C is the cipher text, M is the message in plain text, $E_K$ is the encryption with key K, and $D_K$ is the decryption with key K. Presently, ciphering is not applied to the short messages routed through the GSM network except in the air interface.

The problem with known short message services is that messages are either transmitted to all mobile stations in the coverage area of the transmission (cell broadcast) or with dedicated transmission to one addressed mobile station at a time (point-to-point). Neither of these transmission methods is useful for transmitting messages to a selected group of mobile stations, as prior art cell broadcast cannot be directed only to some of the mobile stations, and transmitting the same message with several point-to-point short messages to a group of mobile stations causes too much signaling in the network and requires a relatively long time to provide all the recipients with the message.

SUMMARY OF THE INVENTION

The object of this invention is to provide multicast transmission to a selected group of mobile stations in a way that minimizes the signaling in the network.

The invention is based on the idea that a broadcast message is used for multicast transmission and a token is needed at the mobile terminal to recover the information sent in this broadcast message intended for multicast. The token is delivered to selected mobile terminals in a point-to-point short message, for example. In the primary embodiment of the invention, the cell broadcast messages intended for multicast are encrypted and the keys for decryption are delivered only to those mobile terminals entitled to receive the multicast messages. The mobile stations store the delivered token, which is in this case the cryptographic key, in their memory, in the SIM card, for example. In the secondary embodiment of the invention, selected mobile terminals are enabled to receive and recover the multicast messages. The token delivered is a command removing the restriction in order to recover the multicast transmission at the mobile terminal. For example, the command might be an instruction to start to listen to the multicast or an instruction to tune in to a certain channel.

The advantage of the method according to the invention is that it provides a way to implement a short message service to a selected group of mobile terminals on a subscription basis.

Another advantage of the method according to the invention is that it uses network capacity sparingly, since the information can be delivered to several mobile terminals with only one short message.

The advantage of the arrangement according to the invention is that the token delivery and the recovery of the multicast messages is transparent for the mobile subscriber.

BRIEF DESCRIPTION OF THE DRAWINGS

The preferred embodiments of the invention will now be described with reference to the attached drawings, in which.

DETAILED DESCRIPTION OF THE INVENTION

The present invention can be applied to any radio network. The invention will be described below in more detail mostly by using the digital mobile communications system GSM as an example. FIG. 1 shows the simplified structure of a GSM network as described earlier. For a more detailed description of the operation and structure of a GSM system, a reference is made to GSM specifications and to the book: "The GSM System for Mobile Communications", M. Mouly & M. Pautet, Palaiseau, France, 1992, ISBN:2-9507190-0-7.

In the following, the primary embodiment of the invention is described in more detail with reference to FIGS. 4, 5, and 6. In the primary embodiment of the invention, the token needed for multicast message recovery is a cryptographic key. This cryptographic key is used to encrypt the multicast message before transmission and to decrypt the multicast message at selected mobile stations.

Figure 4:
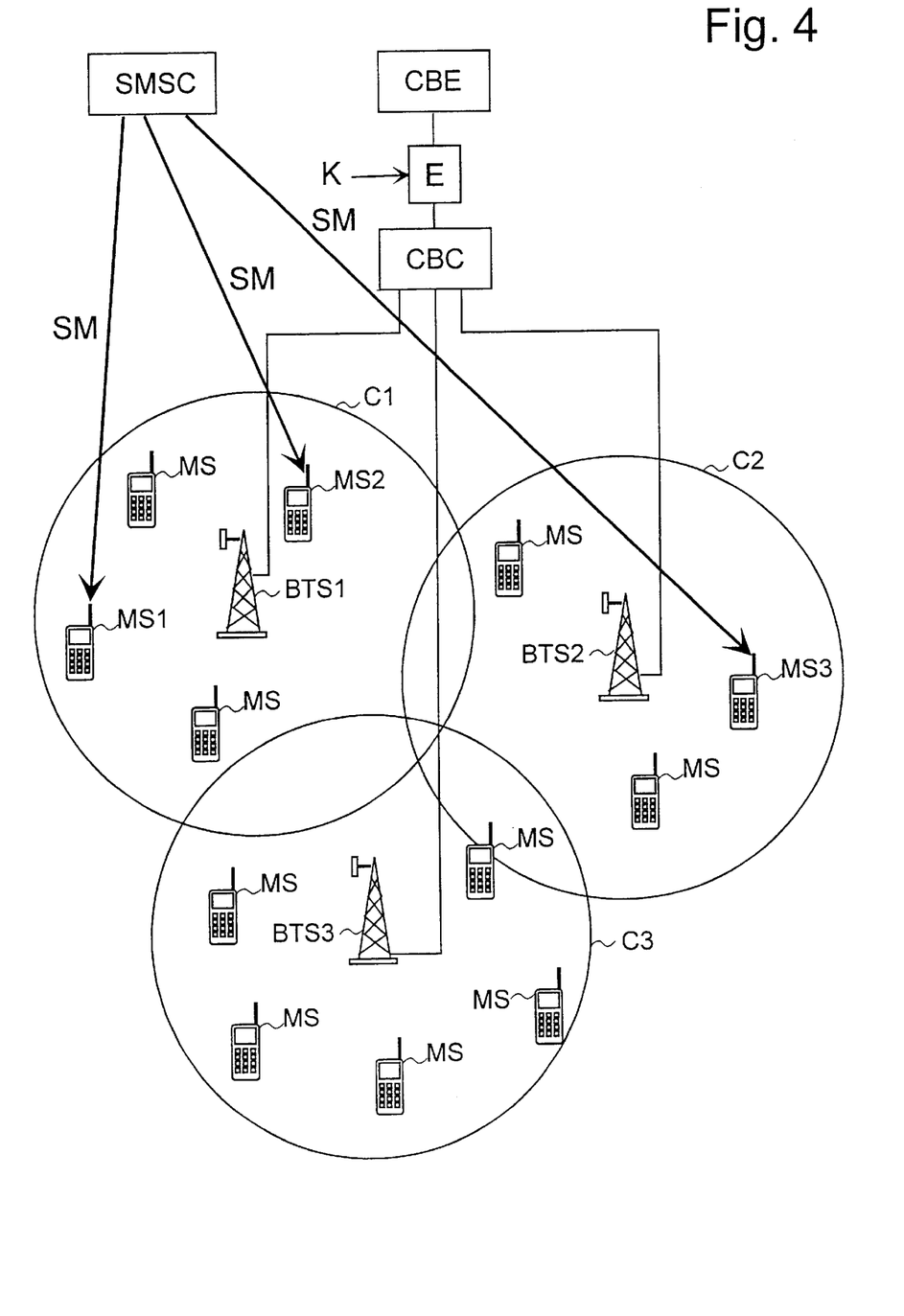
FIG. 4 shows a multicast network according to the primary embodiment of the invention.

FIG. 4 shows an example of a multicast network with cells C1, C2, and C3. In each of these cells one of the base stations BTS1, BTS2, BTS3 serve mobile stations MS, MS1, MS2, MS3 in the area of the corresponding cell. In the network in FIG. 4, mobile subscribers can subscribe to a special service, such as top ten news delivery, implemented with the multicast method according to the invention. For example, in FIG. 4 mobile stations MS1, MS2, and MS3 have indicated, by a telephone call, a point-to-point short message or by paying a subscription fee to the service provider's bank account, for example, that they wish to subscribe to this special service. According to the invention, the short message service center SMSC delivers to the group of special service subscribers MS1, MS2, and MS3 a point-to-point short message including a cryptographic key K for this special service. These point-to-point messages, marked with SM in FIG. 4, are delivered to the mobile stations via the GSM network as described earlier in connection with prior art. For clarity reasons this short message routing is not shown in FIG. 4. The cryptographic key K according to the invention is stored advantageously in the SIM card of the mobile stations MS1, MS2, and MS3. Another alternative is to store the cryptographic key K in other parts of the mobile station, in the mobile equipment part, for example.

In FIG. 4 the cell broadcast entity CBE initiates cell broadcast messages according to prior art. Those cell broadcast messages intended for multicast delivery are, according to the invention, encrypted in unit E with the cryptographic key K. The cryptographic algorithm used can be any symmetric cipher algorithm, for example. The encryption unit for encrypting the multicast messages can be located at the CBE, for example. The cell broadcast center CBC controls the cell broadcasts of base stations BTS1, BTS2, and BTS3 and sends cell broadcast messages to the base stations addressed. The base stations broadcast these encrypted cell broadcast messages. All the mobile stations located in the area of cells C1, C2, C3 receive the encrypted cell broadcast message, but only the mobile stations which subscribed to this special service can decrypt and read the messages.

Figure 5:
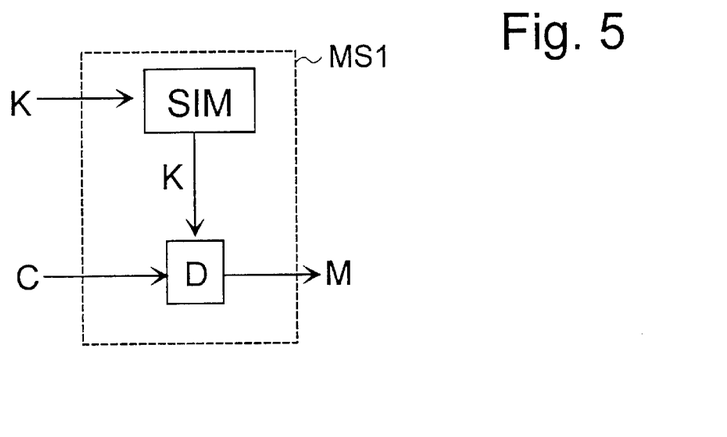
FIG. 5 shows the functional parts of the mobile station according to the primary embodiment of the invention.

FIG. 5 shows the primary embodiment of one mobile station MS1 according to the invention. The functionality of the other mobile stations MS2 and MS3 realizing the primary embodiment of the method according to the invention is similar to that of MS1. According to the invention, MS1 stores the cryptographic key K received in a point-to-point short message in a SIM card for later retrieval. When receiving an encrypted cell broadcast message C, the MS1 identifies the message and chooses the correct cryptographic key K from the memory, as located in the SIM card, for example. The MS1 decrypts the received message C in box D with the chosen key K and gets the short message M in plain text form. From the subscriber's point of view, the key delivery and the decryption of the multicast messages is fully transparent.

In case the same mobile station MS subscribes to several special services, there is need to deliver several cryptographic keys to the mobile station. These cryptographic keys must be identified in order to apply them for the right encrypted messages. For example, an encrypted message can be identified using the message identifier field of the message. This field identifies the source and type of the message. The message identifier field is not encrypted. Based on this message identifier value, the mobile station then chooses the cryptographic key K corresponding to the special service that the message represents.

Figure 6:
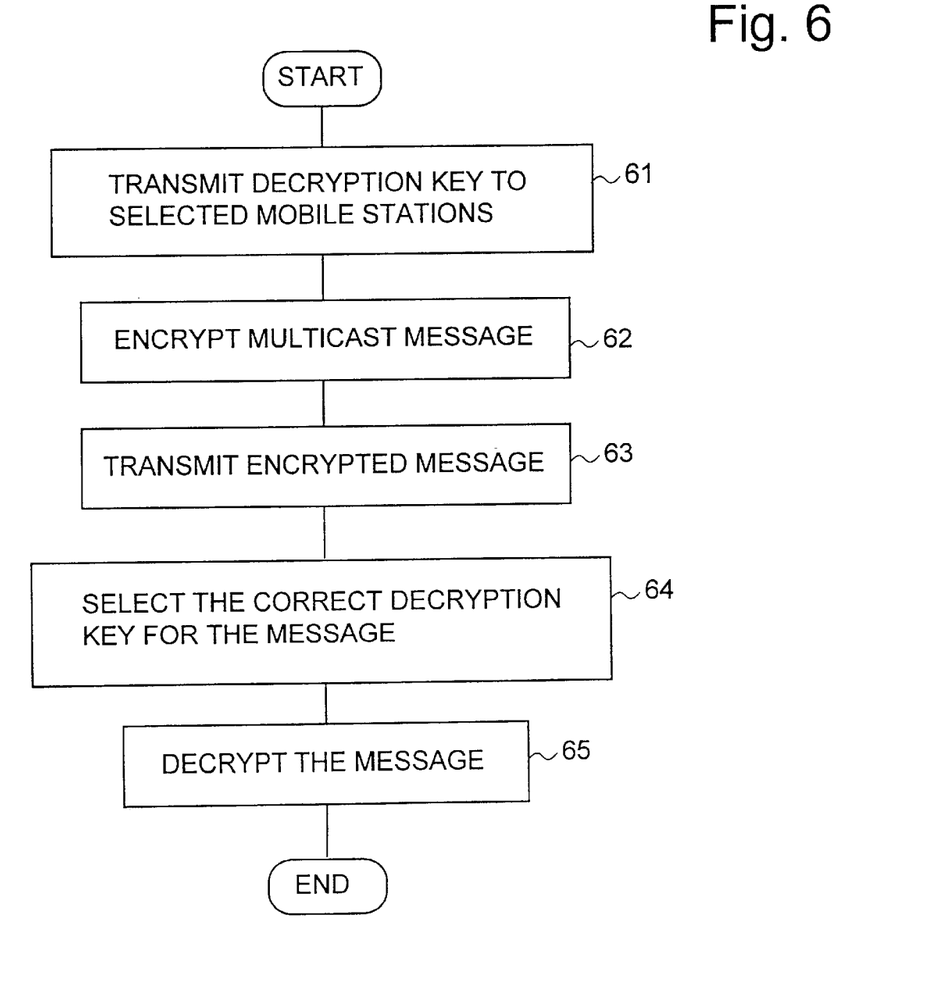
FIG. 6 shows the primary embodiment of the invention as a flowchart.

FIG. 6 shows the method according to the primary embodiment of the invention as a flowchart. At stage 61 in FIG. 6, the cryptographic key K for decryption is delivered to the selected mobile stations, with a point-to-point short message. The cell broadcast message intended for multicast is encrypted with the cryptographic key K (stage 62). After that the encrypted message is broadcast from the base stations addressed (stage 63) and received in mobile stations located in the coverage area of the transmission. The selected mobile stations choose the cryptographic key K corresponding to the encrypted message received (stage 64) and decrypt the message with this correct key K (stage 65) after which the message is legible and understandable in plain text form.

Figure 7:
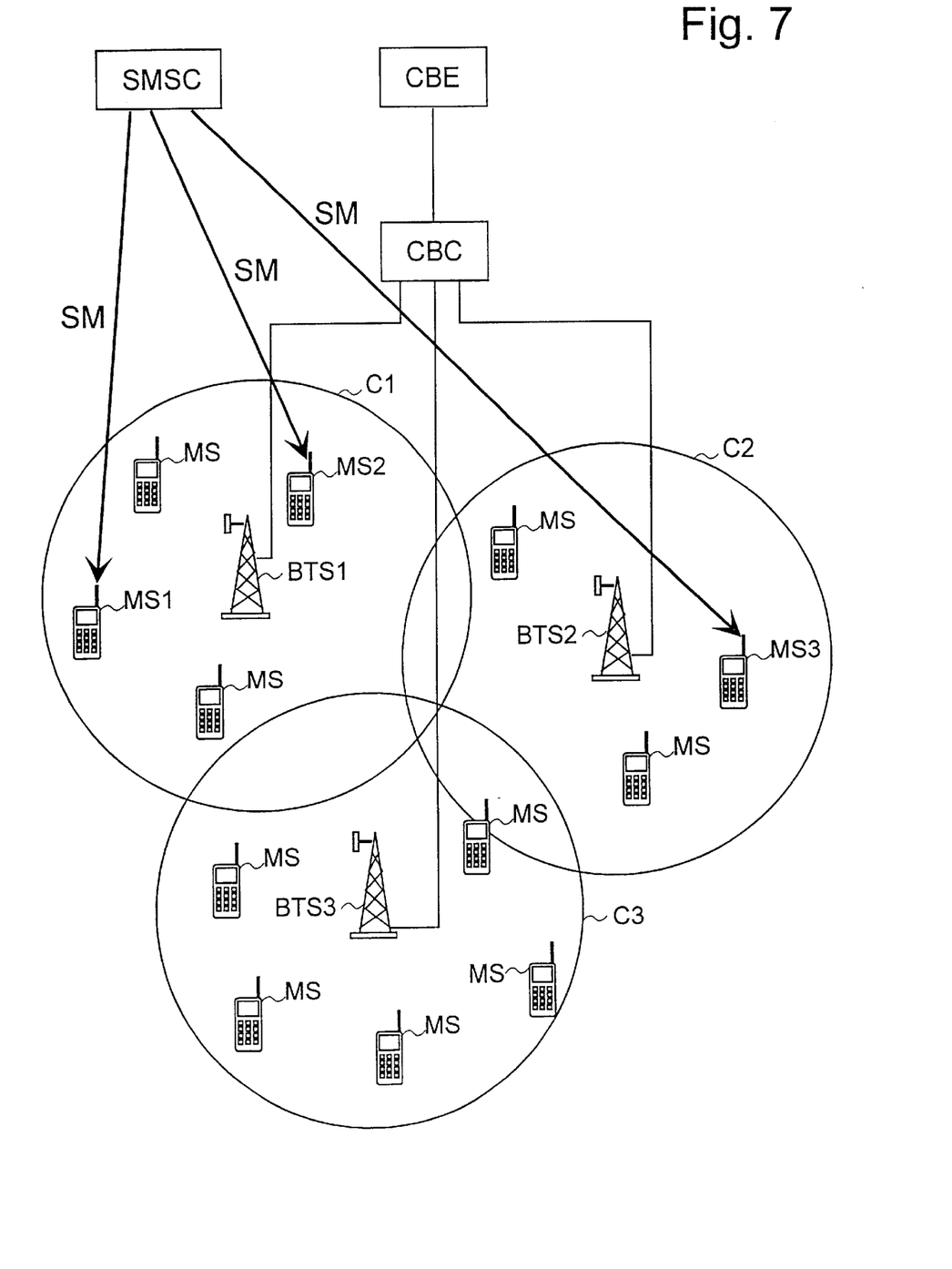
FIG. 7 shows a multicast network according to the secondary embodiment of the invention.

FIG. 7 shows an example of a multicast network according to the secondary embodiment of the invention. As described above in connection to FIG. 4 of the primary embodiment of the invention, the mobile stations MS1, MS2, and MS3 have indicated that they wish to subscribe to the special service provided with the multicast method according to the invention. In the secondary embodiment of the invention, the short message service center SMSC delivers to the group of special service subscribers MS1, MS2, and MS3 a point-to-point short message which includes a command enabling the mobile station to start to recover the transmission of the special service in multicast. This command may include instructions to tune in to the channel of the transmission and/or a message which acts as a kind of password in allowing the mobile station to recover the multicast service. These point-to-point short messages are marked with SM in FIG. 7. The multicast message is initiated, routed, and broadcast in the same way as a cell broadcast message described in connection with prior art.

In the secondary embodiment of the invention, the restriction to utilize the cell broadcast message intended for multicast is at the mobile station. All the mobile stations in the coverage area of the transmission are able to listen to this special multicast transmission but only the mobile stations MS1, MS2, MS3 subscribing to the multicast service are able to recover the information of this multicast by the special enabling point-to-point short message SM. Therefore, other mobile stations marked with MS in FIG. 7 are not able to recover the information in the multicast message.

Figure 8:
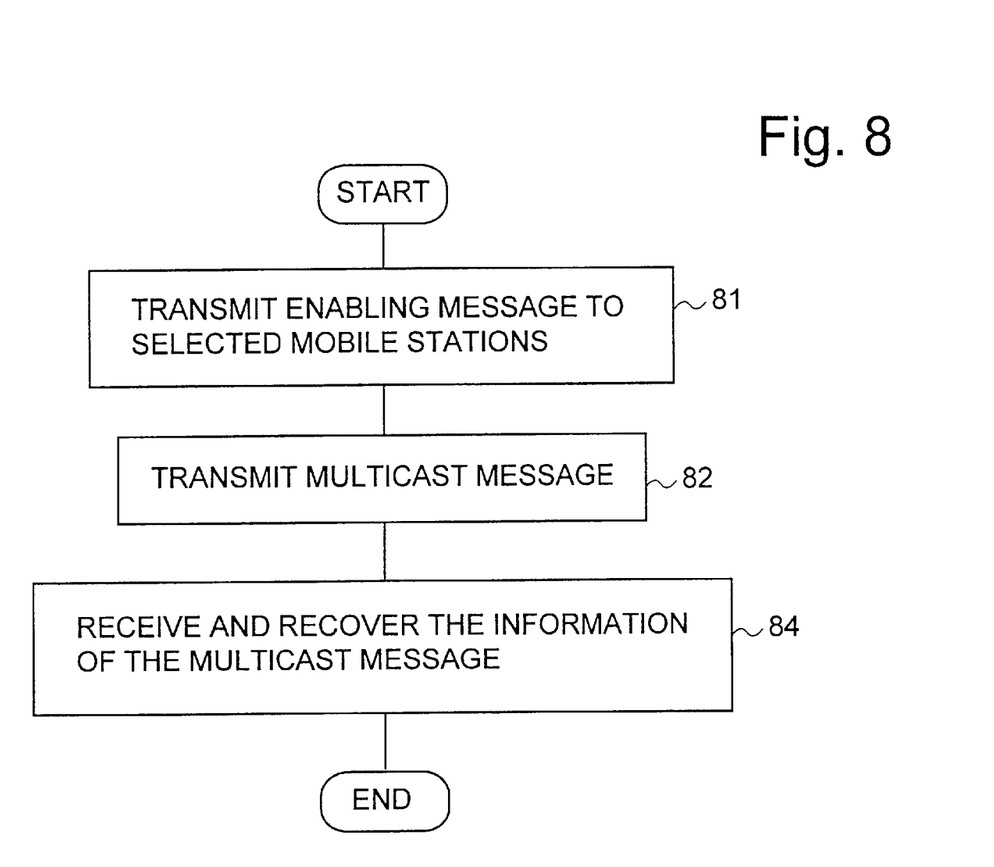
FIG. 8 shows the secondary embodiment of the invention as a flowchart.

FIG. 8 shows the method according to the secondary embodiment of the invention as a flowchart. In the secondary embodiment of the invention, the recovery of the information in the multicast message is made possible at selected mobile stations with a special command. At stage 81 in FIG. 8 the SMSC transmits the enabling point-to-point short message to the group of selected mobile stations. The addressed base stations broadcast the multicast message (stage 82) in the same way as a prior art cell broadcast message. This message is received and recovered at the selected mobile stations (stage 84).

The token delivery messages of the primary and secondary embodiment of the invention can be encrypted or otherwise provided connection security.

In the other embodiments of the invention, instead of point-to-point short message delivery, the token can be delivered to the selected mobile stations by mail or by manual implantation via the keyboard, for example. The token delivered, such as the cryptographic key K used to encrypt cell broadcast messages, can be changed periodically for security or invoicing purposes, for example. The new token is delivered to active subscribers, i.e. to subscribers who have paid their renewal fees, for example. The old token expires when the new token is delivered. The new token is then necessary for multicast message recovery. Otherwise the other embodiments of the invention correspond to the primary or secondary embodiments described above.

The drawings and the related description are only intended to demonstrate the principles of the invention. The details of the method according to the invention can vary within the patent claims. The invention is not restricted for use only in connection with GSM network as presented above in the examples, but can be applied to any radio network. Therefore, the mobile station of the examples above should be understood to be any mobile terminal in any radio network. Although the invention was described above mostly in connection with cell broadcast messages in the GSM network, the invention can be applied to any messages transmitted in an area for all the mobile terminals located in that area, point-to-multipoint messages in GPRS (General Packet Radio Service), for example. The functionality according to the primary embodiment of the invention is also suitable for use with cryptographic algorithms other than the symmetric algorithm described above.

What is claimed is:

1. A method for multicast in a mobile telecommunications network, which includes at least one base station and a plurality of mobile terminals, comprising:
   broadcasting the message from at least one base station,
   receiving the broadcast message at mobile terminals,
   formulating at least one broadcast message as a multicast message,
   delivering a token needed to recover the information of the multicast message to a selected first group of mobile terminals using point-to-point short messaging, the selected first group of mobile terminals including at least two mobile terminals, and
   using the delivered token at the selected first group of mobile terminals to allow the reception and recovery of the multicast message.

2. A method according to claim 1, further comprising:
   delivering a cryptographic key as the token to the selected first group of mobile terminals,
   encrypting a broadcast message with the cryptographic key before broadcasting the broadcast message,
   decrypting the broadcast message at mobile terminals of the selected first group with the delivered cryptographic key.

3. A method according to claim 2, further comprising delivering the cryptographic key to the selected first group of mobile terminals with point-to-point-short messages.

4. A method according to claim 2, further comprising storing the cryptographic key at the mobile terminals.

5. A method according to claim 2, further comprising storing the cryptographic key in respective SIM cards of the mobile terminals.

6. A method according to claim 2, further comprising changing the cryptographic key and delivering the new cryptographic key to a selected second group of mobile terminals.

7. A method according to claim 6, wherein the selected second group of mobile terminals differs from the selected first group of mobile terminals.

8. A method according to claim 1, further comprising:
   identifying the multicast message by a message identifier attached to the message and
   choosing the cryptographic key relating to the message based on the message identifier of the multicast message.

9. A method according to claim 1, further comprising:

delivering an enabling command to the selected first group of mobile terminals as the token, and enabling the reception and recovery of the multicast message at mobile terminals which have received the enabling command.

10. A method according to claim 9, further comprising delivering the enabling command to the selected first group of mobile terminals with point-to-point short messages.

11. A method according to claim 9, further comprising enabling the reception and recovery of the multicast message at the selected first group of mobile terminals by tuning the mobile terminals to the correct channel.

12. A method according to claim 1, further comprising transmitting the multicast message in short message form.

13. An arrangement for multicast in a mobile telecommunications network, comprising:

a message source for generating broadcast messages, a broadcasting entity for controlling the broadcasting of the broadcast messages, base stations which broadcast the broadcast messages, mobile terminals which receive the broadcast messages, a delivery unit for delivering a token to selected mobile terminals via point-to-point short messages, and an enabling unit for enabling multicast message reception and recovery of broadcast messages at the selected mobile terminals using the token.

14. An arrangement according to claim 13, further comprising:

a delivery unit for delivering a cryptographic key as the token to the selected mobile terminals, storage units for storing the delivered cryptographic key at respective mobile terminals, an encryption unit for encrypting the broadcast messages intended for multicast, and decryption units at respective mobile terminals for decrypting the encrypted messages using the cryptographic key.

15. An arrangement according to claim 13, wherein the broadcast messages are cell broadcast messages.

* * * * *